Nov. 6, 1923.  
J. COYNE  
1,473,177  
COMBINATION BOLT AND NUT RETAINER  
Filed Sept. 21, 1921
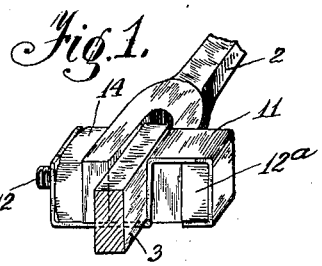
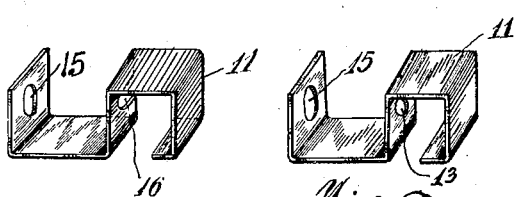
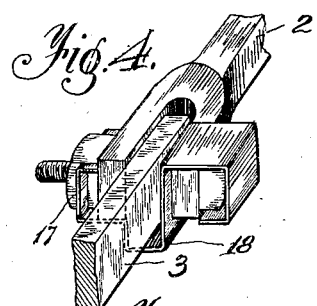
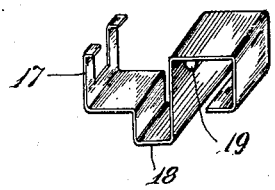
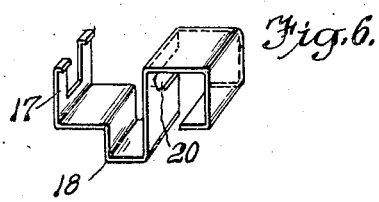
INVENTOR  
James Coyne  
by Raeph Donath &  
Paul Purchard.  
Attorneys.

Patented Nov. 6, 1923.

1,473,177

UNITED STATES PATENT OFFICE.

JAMES COYNE, OF PITTSBURGH, PENNSYLVANIA.

COMBINATION BOLT AND NUT RETAINER.

Application filed September 21, 1921. Serial No. 502,249.

*To all whom it may concern:*

Be it known that I, JAMES COYNE, a citizen of the United States, residing at Pittsburgh, in the county of Allegheny and State of Pennsylvania, have invented certain new and useful Improvements in Combination Bolt and Nut Retainers, of which the following is a specification.

This invention relates to retaining devices, and more especially to combination bolt and nut retaining devices.

One of the main objects of this invention is to provide a device which is of very simple construction and application and which can be manufactured at low cost. Another object is to provide a bolt retainer which can be applied on old constructions as well as on new ones with rapidity and ease. Still another object is to provide a retainer which can be applied without the removal of the bolt or pin which it is to retain. Further features and advantages will appear from the specification and drawings which form a part of this application.

In the drawings:

Fig. 1 is a perspective view showing the application of one type of my combination bolt and nut retainers.

Fig. 2 is a perspective view of the combination bolt and nut retainer used in Fig. 1.

Fig. 3 is a perspective view of a modified combination bolt and nut retainer.

Fig. 4 is a perspective view of the application of a modified combination bolt and nut retainer.

Fig. 5 is a detailed perspective view of the combination bolt and nut retainer used in Fig. 4.

Fig. 6 is a perspective view of a modification of the bolt and nut retainer shown in Fig. 5.

Referring to the various drawings, my invention is to be used especially in conjunction with hinged connections as are found in great number in the different systems of car brake levers employed on railroad cars and also to similar connection often encountered in bridge work, etc.

The general principle of my invention is to provide a retainer for hinge-pins, bolts and nuts which is made of a pliable strip of metal and which can be applied easily, either during the erection of a structure or subsequently thereto.

In Figs. 1 to 6 inclusive, I have shown various designs of my combination bolt and nut retainers which are to be used in conjunction with hinged connections provided with bolts and nuts, the bolts in these cases forming the hinge-pins.

In the design shown in Fig. 1, the unfolded retainer 11 is inserted between the rod-jaw 2 and the connected member 3; the square headed bolt 12 is then introduced in suitable apertures provided in both sides of the jaw and through the hole 13, conveniently positioned in the retainer. The up and downwardly extending ends of the retainer are then respectively folded over the bolt-head 12$^a$ and the nut 14, thus giving to the combination retainer the substantially S-shaped form shown in Fig. 2. The left hand end of the retainer is provided with the elongated aperture 15 to allow for the passage of the bolt extension beyond the nut 14.

It will be noted that when the above described retainer is used, the left hand side thereof acts as a lock and retainer for the nut, whereas the right hand side of the retainer eliminates any possibility of the bolt proper from falling out, even though the nut should, for some reason or other, be knocked off the bolt.

The modified construction of the combination bolt and nut retainer shown in Fig. 3 is intended to be applied on old structures, where the removal of the bolt would be too cumbersome or inadvisable. As illustrated, the circular aperture 13, Fig. 2, has been replaced by the open slot 16, thereby enabling the retainer to be passed over the bolt from the front of the hinged connection.

It has been my experience that the rod-jaws and clevises used on railroad cars, bridges and other structures are generally considerably wider than the connected members hinged thereto; there is usually sufficient clearance to insert the retainer in place. Therefore, in old structures it is only necessary to shift the connected member sufficiently to one side in the jaw to permit the insertion of my retainers. These, when properly bent, will then hold the hinge-bolts or pins positively in place.

Figs. 4 and 5 illustrate another design for a combination bolt and nut retainer. The left hand end 17 is bifurcated to embrace within its wings the flat sides of the nut, thus locking it against rotation. If desired, the extremities of said wings may be turned inwardly at right angles so as to bear against the outside of the jaw. This bifurcated construction is especially appropriate in cases where the body of the bolt extends considerably beyond the nut, as shown in Fig. 4. In such cases it would not be practical to provide in the end of the retainer an elongated hole of sufficient length to pass over the protruding end of the bolt.

The combination retainer represented in Fig. 5 is also provided with a rectangular depression 18, positioned so as to correspond vertically with the connected member 3. The purpose of this depression is to allow for the rocking movements of the connected member, such as would occur in the various systems of car-brake levers, for instance. The mode of application of this modified combination bolt and nut retainer is practically the same as that described in connection with Fig. 3, and needs therefore not be repeated here. If desired, the circular bolt aperture 19 may be replaced by an open slot 20, similar to the one shown in Fig. 7, for the purpose of applying the retainer on old structures; this modification is shown in Fig. 6.

While I have described in the foregoing my invention as applied to square headed hinge-pins and bolts, it is evident that satisfactory results are obtainable with heads or nuts of different shapes, such as round or hexagonal. Moreover, the use of my device may be extended to other fields than those mentioned, wherever pins, bolts or nuts are liable to become loose through shocks, vibrations or other causes.

It may be found desirable in practice to resort to slight changes in the construction of my invention, to suit prevailing conditions, without departing from the field and scope of the same, and I intend to include all such variations as fall within the scope of the appended claims, in this application in which the preferred forms only of my invention are disclosed.

What I claim is:

1. In combination, a hinged connection of the character described having a hinge-bolt and nut; unitary locking means to simultaneously prevent the rotation and accidental disengagement of said bolt and nut; said locking means being substantially S shaped and having two parallel and adjacent sides traversed by said hinge-bolt; the outer one of said parallel sides having an elongated aperture and the other parallel side having a slot; said aperture and slot being engaged by said hinge-bolt.

2. In combination, a hinged connection of the character described having a hinge-bolt and nut; unitary locking means to simultaneously prevent the rotation and accidental disengagement of said bolt and nut; said locking means being substantially S shaped and having alined slots in two parallel and adjacent sides for engagement by said hinge-bolt; the slot in the outer one of said parallel sides being longitudinally directed in said locking means and the slot in the other parallel side being transversely directed thereto.

In testimony whereof I affix my signature.

JAMES COYNE.